United States Patent [19]

Sprunger et al.

[11] Patent Number: 5,056,243
[45] Date of Patent: * Oct. 15, 1991

[54] CONNECTION FOR ELEMENTS AT LEAST ONE OF WHICH IS SUBJECT TO ABRASIVE WEAR

[75] Inventors: Paul C. Sprunger, Dundee; Terry L. Briscoe, Portland, both of Oreg.

[73] Assignee: ESCO Corporation, Portland, Oreg.

[*] Notice: The portion of the term of this patent subsequent to Feb. 26, 2008 has been disclaimed.

[21] Appl. No.: 522,324

[22] Filed: May 11, 1990

[51] Int. Cl.⁵ .............................................. E02F 9/28
[52] U.S. Cl. .................................... 37/115; 37/135; 37/141 R; 172/719; 172/751; 172/753; 403/319; 403/331; 403/381
[58] Field of Search ............... 403/319, 331, 381; 37/141 R, 141 T, 135, 115; 172/719, 749, 751, 753, 772

[56] References Cited

U.S. PATENT DOCUMENTS

| | | | |
|---|---|---|---|
| 3,469,331 | 9/1969 | Wood | 172/719 |
| 4,057,294 | 11/1977 | Krekeler | 403/381 X |
| 4,501,079 | 2/1985 | Hahn et al. | 37/141 R |
| 4,716,666 | 1/1988 | Potter | 172/719 X |

Primary Examiner—Dennis L. Taylor
Assistant Examiner—Arlen L. Olsen
Attorney, Agent, or Firm—Tilton, Fallon, Lungmus & Chestnut

[57] ABSTRACT

A locked connection for structures engageable with abrasive material and the like including a pair of relatively elongated elements at least one of which is subject to abrasive wear, the elements having parallel longitudinally extending centerlines and spaced apart generally planar surfaces arranged at an angle to the centerlines and between which a bi-stress lock is positioned.

15 Claims, 3 Drawing Sheets

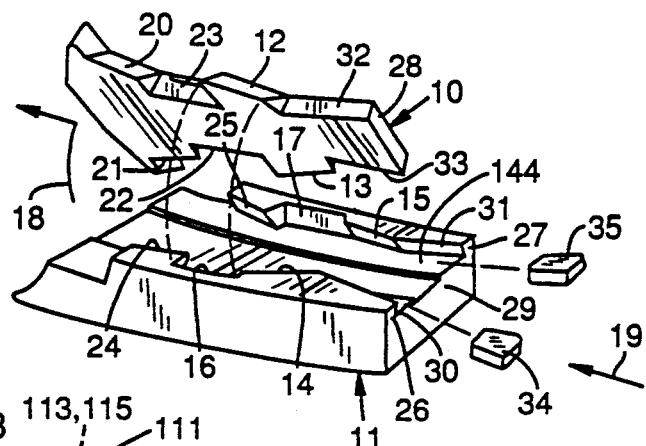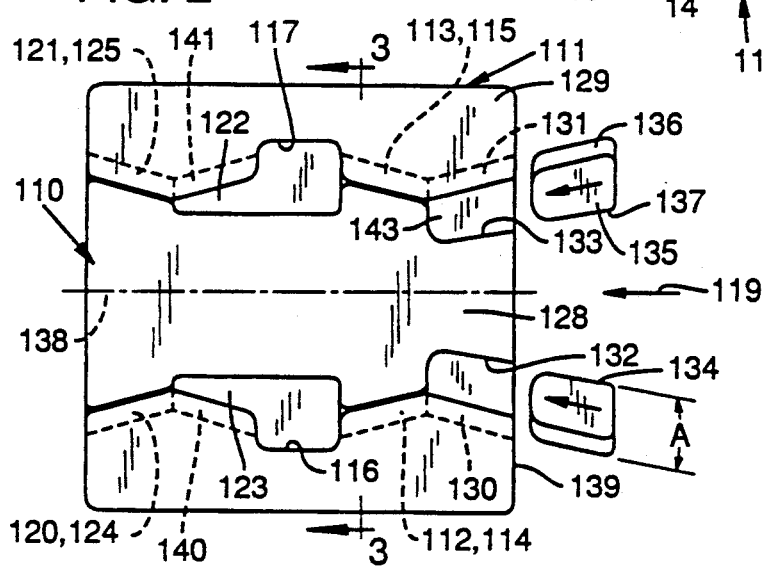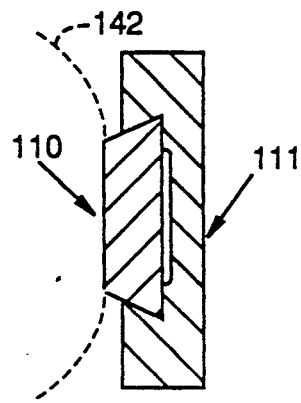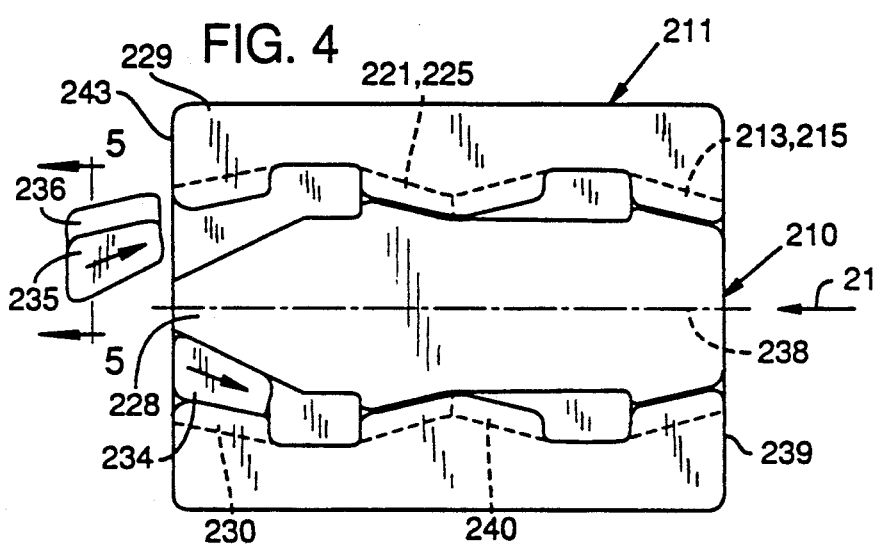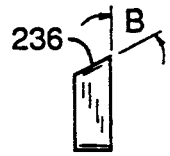

CONNECTION FOR ELEMENTS AT LEAST ONE OF WHICH IS SUBJECT TO ABRASIVE WEAR

BACKGROUND AND SUMMARY OF INVENTION:

This invention relates to a connection for an assembly of elements for installation on the wearable part of a structure engageable with abrasive material and, more particularly, to a connection featuring a bi-stress lock.

This invention in one embodiment is an improvement on co-owned U.S. Pat. No. 4,716,666. In that patent, a pair of spaced apart dovetails were employed to provide a readily replaceable wear element assembly—as for the underside of an excavating bucket. The assembly of the base element and wearable element was intended to be maintained in assembled relation by angling the dovetails so that the force of the normal material flow would drive the mating dovetails in tighter seating (or mating) engagement. To maintain the assembly against a force in the opposite direction—as in bucket "backslap", the ends of adjacent assemblies were butted together and held in series by a stop welded in front of the forward-most assembly.

According to the instant invention, we can provide extended portions on each of the male and female dovetail elements so as to develop opposed and confronting faces. These are adapted to receive locking members which can avoid the need for the onerous securement of the aforementioned stop. The invention has application not only to the wearable element assembly of the '666 patent but can be employed for other connections where at least one of the elements is subject to abrasive wear. Illustrative of other applications are those involving excavators where the inventive connection can be employed to releasably secure a shroud or series of shrouds to a bucket lip or to releasably secure a tooth adapter to a bucket lip.

The invention can be characterized generally in providing a bi-stress lock type connection for first and second relatively elongated mated elements where at least the second element has a surface subject to abrasive wear, the elements being movable into mating relation by movement of one relative to the other along a path parallel to the longitudinal center line of the elements. The elements, when mated, have adjacent spaced apart, generally planar surfaces at corresponding ends thereof and extend at an angle to the longitudinal centerlines. The planar surface in one of the elements is provided by a generally rectangular cavity therein and a generally rectangular block is mounted in the cavity engaging the spaced apart planar. surfaces. By this, the component of a force parallel to the longitudinal centerlines tending to unmate the elements imposes a compression and shear stress on the block so as to lock the elements in mated condition. Further, at least one of the elements has a wall portion substantially covering the block.

The invention is explained in conjunction with the accompanying drawing, in which FIG. 1 is an exploded perspective view of the invention as it would be applied to the wear runner assembly of the '666 patent;

FIG. 2 is a top plan view of a modified form of the invention wherein the female element is reversibly mountable on the base element;

FIG. 3 is a sectional view such as would be seen along the sight line 3—3 applied to FIG. 2;

FIG. 4 is another embodiment of the invention and which features the locking members mountable at the other end of the dovetail assembly from that seen in FIG. 2;

FIG. 5 is a sectional view taken along the sight line 5—5 applied to FIG. 4;

DETAILED DESCRIPTION

Figure 6:
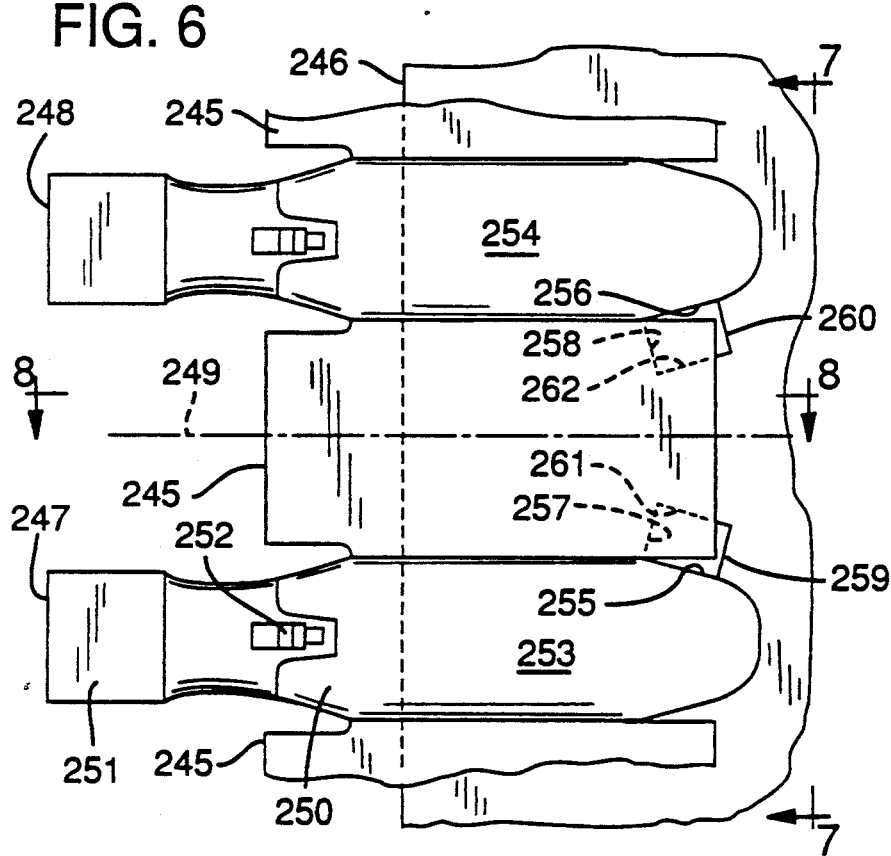
FIG. 6 is a fragmentary bottom plan view of a portion of a excavator showing the invention applied to a shroud locked between two teeth.

With reference first to FIG. 1, the numeral 10 designates generally a plate-like first or base element which is adapted to be secured to the underside of a dragline bucket or any other wearable part for which a plate-like second or replacement wearable element generally designated 11 is indicated.

The base element 10 is equipped with a first pair dovetail surfaces 12, 13 which are mateable with female dovetail surfaces 14, 15 on the wearable element 11. To facilitate assembly, notches 16 and 17 are provided adjacent the female dovetail surfaces 14, 15. Connection between the two elements is achieved by moving the wearable element 11 first upwardly and then rearwardly as designated by the arrow 18—this being the case where the normal material flow is in the direction of the arrow 19, see the right hand end of FIG. 1.

In the illustration given in FIG. 1 (which is based upon the '666 patent) a second pair of male dovetails 20, 21 are spaced longitudinal rearwardly of the dovetail surfaces 12, 13, being separated therefrom by notches 22 and 23. In similar fashion, an additional pair of dovetail surfaces 24, 25 are provided on the wearable element 11. Again, these are separated from the first pair 14, 15 by the notches 16, 17. The notches and dovetail surfaces are advantageously provided in the wearable element 11 by outstanding integral wall portions as at 26, 27—see the designations at the right hand side of FIG. 1. The foregoing is a brief summary of the structure seen in '666 patent and express reference is made thereto for additional details of construction and operation not set forth herein.

In this embodiment of the invention, the base element 10 has a portion 28 extending beyond the dovetail surfaces 12, 13 in the forward longitudinal direction, i.e., the direction first encountering flow of material. Likewise, the wearable or female element 11 has a corresponding forward extended portion 29. The portion 29 is equipped with a pair of spaced apart confronting faces 30, 31. The extended portion 28 is equipped with opposed faces 32, 33 which, when the elements are mated, are transversely aligned with the confronting faces 30, 31. Thus, we provide spaced apart associated faces for the receipt of lock members 34, 35 as between the associated faces 30, 32 and 31, 33. This can be better appreciated from a consideration of the embodiment of FIG. 2.

Now referring to FIG. 2, the faces which were just referred to (for the purpose of receiving the locks—are now designated 134 and 135) are seen at the right hand end of FIG. 2 and designated 130, 132 and 131, 133. Each of the lock members 134, 135 have faces conforming to the associated faces in the mated dovetail elements. For example, and referring to the lock member 135 the face 136 conforms to the face 131 on the female or wearable element 111 while the conforming face 137 is contoured to mate with the face 133 on the male or base element 110. The element 134 is similarly arranged and mounted—except for being a mirror image of the member 135 in the conforming and associated faces thereof.

To correlate the arrangement of FIG. 2 with that of FIG. 1, reference is now made to the first pair of dovetail surfaces which, in FIG. 2 include the surfaces 112, 114 and the surfaces 113, 115. These are seen to be convergently related to the longitudinal centerline 138 when proceeding toward the aligned forward ends 139 of the elements 110, 111.

A second pair of dovetail surfaces are seen in FIG. 2 being designated 120, 124 and 121, 125. The dovetail surfaces on the base element 110 are separated by the notches or recesses 122, 123 while those on the female or wearable element 111 are separated by the notches 116, 117.

One difference between the showings of FIGS. 1 and 2 is that the later includes an arrangement for reversibly mounting the female element 111 on the male element 110. Thus, two additional pairs of dovetail surfaces are provided on the element 111. These include the previously referred to surfaces 130, 131 and also—spaced rearwardly thereof—the surfaces 140 and 141. So, when the female element 111 is rotated 180°, the surfaces 130, 140 occupy the positions shown at 125, 115 in FIG. 2.

Also, in a fashion similar to that of FIG. 1, the embodiment of FIG. 2 has an extended portion 129 on the element 111 while the element 110 has an extended portion 128.

Summarizing the operation relative to the lock members 134, 135, the element 110 has a portion 128 extending beyond its dovetail surfaces 112, 113 in the forward longitudinal direction, i.e., toward the end 139. Likewise, the element 111 has a portion 129 extending beyond the dovetail surfaces 114, 115 in the same longitudinal direction. The portion 129 of the female element 111 is equipped with a pair of spaced apart confronting surfaces 130, 131. The portion 128 of the element 110 is positioned between these confronting faces 130, 131 and has itself a pair of opposed faces 132, 133 transversely aligned with the pair of confronting faces 130, 131 on the element 111. One of each of the opposed faces of the element 110 is associated with and spaced from one each of the confronting faces of the female element 111, viz., 130, 132 and 131, 133. Thus, the locking member 134 is positioned between the faces 30, 132 and the locking member 135 is positioned between the associated faces 131, 133.

Normally, the male element 110 is secured to a structure as a bucket, shroud, point, adapter, etc. which is schematically represented as at 142 in FIG. 3. Thus, the element 111 is the fixed one of the two elements and the dovetail connection is intended to stabilize the female element 111 in place. So, when the normal material flow is in the direction of the arrow 119, the dovetails 112–115 serve this purpose, i.e., the wear element 111 cannot be moved to the left relative to the base element 110.

However, when a reverse force is applied—as where a bucket or the like is dragged rearwardly rather than forwardly, the lock members 134, 135 prevent forward movement, i.e., movement to the right of the wear element 111. The lock members 134, 135 alone may be adequate to maintain the elements 110, 111 assembled particularly where the opposing surfaces 136, 137 have an angle A therebetween of greater than 0° so as to form a locking taper. Even without the locking taper, the angled relationship of the faces 131, 133 and/or the faces 130, 132 with respect to the longitudinal centerline insures that the lock blocks 134 and/or 135 are stressed in compression and shear by the longitudinal component of any applied force. In some cases, the lock may be driven in place and secured by a tack weld to the base or by some other mechanical means.

Thus far, we have described first the embodiment of FIG. 1 which is uni-directional in its mounting and that of FIG. 2 which is bi-directional. The latter is advantageous where wear occurs preferentially at one end (usually the forward end) of the wear element. This is particularly true in chute liners. However, the inventive lock can be used to advantage in other environments, and for that matter, when there is only a single pair of dovetail surfaces which could be the case where the showing in FIG. 3 is employed in a construction found only to the right of the sight line 3—3.

The arrangement of FIG. 2 has the lock installed in the front of the wear part. This can serve to lock a column of runners onto bases by installing the lock in the front runner/base only. This is valuable where access is limited by wear part design or location.

On the other hand, there are instances where the rear locking version is desirable. This is valuable when the front is limited by design or part location as for example in mechanically locking a shroud onto a bucket lip. The rear locking version is seen in FIG. 4 where numerals similar to those previously employed are used but with the addition of an extra "100". Thus, the base element is generally designated 210 and the wear element generally designated 211.

Again, the direction of normal material flow is designated by the arrow 219 and the forward end of the assembly by the numeral 239. Here, however, the extended portion 228 is positioned rearwardly on the element 210 and the extended portion 229 is likewise at the rear of the female element 211. However, the construction of FIG. 4 is also bi-directional, i.e., the female element 211 is reversibly mountable by virtue of having four pairs of interlaced dovetail surfaces. Those shown to be engaged include the surfaces 213, 215 and 221, 225. Those not engaged by the dovetail surfaces on the base element 210 include the surfaces 240 and 230—the later being employed for abutting the lock 234 while the lock 235 is seen spaced from its ultimate seating position.

In either case, one of the surfaces 136, 236 of the lock members 134, 135, 234, 235 can be inclined at the angle B seen in FIG. 5 so as to conform to the mating dovetail surface on the wear element 111, 211. Also, in the case of both the embodiments of FIGS. 2 and 4, the portions 128, 129, 228, 229 are located between the dovetail surfaces and one end of the assembled elements—the forward end in the case of FIG. 2 and the rear end in the case of FIG. 4.

Also in each embodiment, each element face 130, 133 is divergently related to the longitudinal centerline 138, 238 when proceeding toward the end of each element in which the lock is inserted, viz, the end 139 in FIG. 2 and the end 243 in FIG. 4.

It will be noted that the base elements 10, 110 and 210 provide, in effect, a cavity for the receipt of the locks 34, 5, etc. For example, one such cavity (for the lock 135 of FIG. is designated 143. This stems from the fact that the face 133 is positioned closer to the centerline than the faces 113 and 131. The cavity 143 is open at the top, i.e., that facing the bucket, etc. structure 142—designated in FIG. 3. So the lock block 135 is protected on its top by the excavator. On its bottom, the lock block 135 is protected by the wall portion 144 of the forward end of the wear element. This wall portion 144 is designated only in FIG. 1 at the upper right hand end thereof. Thus, we provide a protected compression and shear block lock.

Other Excavator Connections

Figure 7:
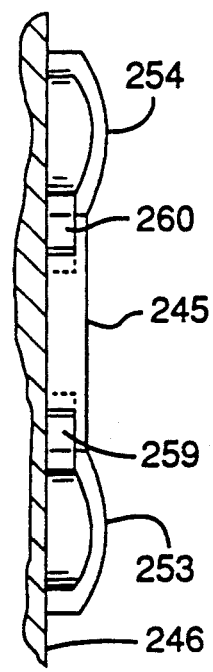
FIG. 7 is a fragmentary rear elevational view partly in section as seen along the sight line 7—7 of FIG. 6.
Figure 8:
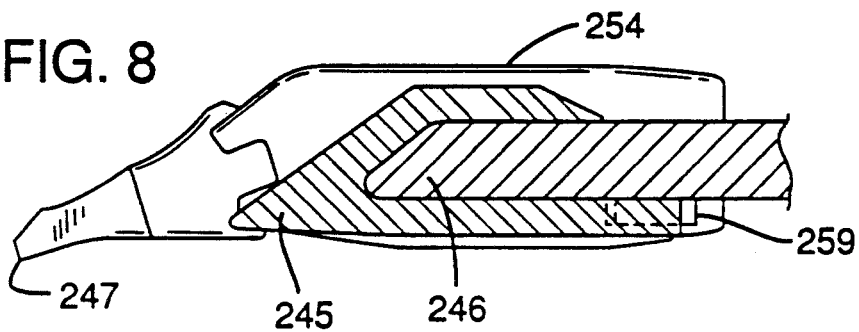
FIG. 8 is a fragmentary sectional view taken along the sight line 8—8 of FIG. 6.

Reference is now made to FIGS. 6-8 which show application of the invention to a shroud 245 applied to the lip 246 of a bucket or other piece of excavating equipment. In the illustration given, the lip 246 is equipped with forwardly projecting teeth 247, 248 which are laterally spaced on opposite sides of the shroud longitudinal centerline 249. We use the term longitudinal to refer to the direction of movement of the shroud, tooth or other attachment when the same is moved relative to the bucket incident to installation. In some instances, the shroud may have a longer dimension transverse of the bucket—see the shroud 345 of FIG. 9—but we still prefer to designate the direction of movement "longitudinal".

Each tooth has an adapter (as at 250 relative to the tooth 247) and a point 251 which is removably secured in conventional fashion to the adapter 250 by pin means 252. The adapters have a plate-like shank as at 253 relative to the tooth 247 and 254 relative to the tooth 248 which can be secured to the lip also in conventional fashion—as by bolts, welding, etc.

Each shank has a generally planar bearing surface extending in angled relation to the longitudinal centerline 249—as at 255 on the shank 253 and 256 on the shank 254. The shroud 245 adjacent its rear end is equipped with cavities at 257 and 258 in which bi-stress locks 259 and 260, respectively, are mounted. Each cavity is partly defined by a generally planar surface or wall 261, 262 which extends generally parallel to the generally planar surface 255, 256 on its associated adapter. Hence, the walls 261, 262 are also at an angle to the centerline 249 so that any applied force tending to unseat the shroud 245 has a longitudinally extending component which places the blocks 259, 260 in compression and shear. Any rearwardly directed force merely forces the shroud 245 onto the lip because of the essential J-shape of the shroud—see FIG. 8.

It will be seen that the locks 259, 260 are substantially covered on the bottom—the side facing the viewer in FIG. 6—by the shroud 245 and on the top by the lip 246 (see FIG. 8). With this arrangement both the top and bottom surfaces of the shroud are subjected to abrasive wear—as contrasted to only one surface of the wearable element 11, 111 or 211 of the previously-described embodiments.

We have found that angles for the planar surfaces or walls 255, 256, 261, 262 in the range of about 15° to about 30° are particularly advantageous in securing the installation of the block locks 259, 260.

Figure 9:
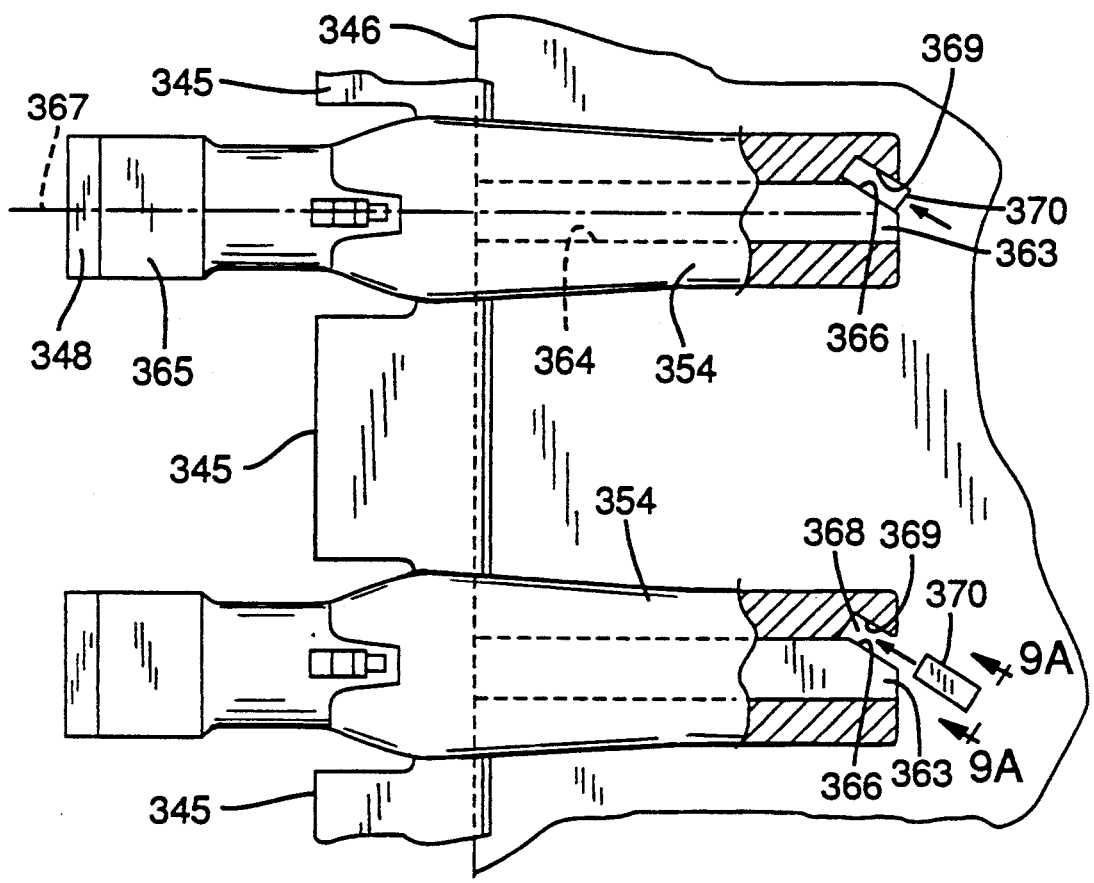
FIG. 9 is a fragmentary top plan view of an excavator showing teeth adapters secured by the invention.

The invention can also be used beneficially in connection with securing the plate-like adapter shanks to the bucket lip—as seen in FIG. 9. There, the lip is designated 346 and a shorter shroud designated by the numeral 345 is removably secured to the lip 346 by any conventional means as well as by the arrangement of FIGS. 6-8.

In FIG. 9, the bucket lip 346 is equipped with welded or cast on bars as at 363 longitudinally aligned relative to the tooth 348. The adapter shank 354 has a slot 364 so as to flank the bar 363. Each bar 363, adjacent its rear end—the end opposite the point 365—is equipped with a generally planar surface or sidewardly-facing wall 366. This in angled relation to the longitudinal centerline 367.

Figure 9A:
FIG. 9A is a sectional view taken along line 9A—9A of FIG. 9.

A cavity 368 is provided in the shank 354 defined in part by an angled planar wall 369. Inserted into the cavity 368 is bi-stress lock 370 which advantageously has a generally rectangular cross section—see FIG. 9A.

Again, the lock 370 is protected, i.e., substantially covered by the wearable element. In this case, the covering is developed by the bottom wall of the cavity provided by a wall portion of the adapter shank. In other respects, the operation of the bi-stress lock 370 of FIG. 9 is like that described relative to the embodiment of FIGS. 6-8.

While in the foregoing specification, a detailed description of the invention has been set down for the purpose of illustration, many variations in the details herein given may be made by those skilled in the art without departing from the spirit and scope of the invention.

We claim:

1. A relatively elongated plate-like element having outer surfaces one of which is subject to abrasive wear, said element being mateable with a base member by movement parallel to the longitudinal centerline of said element, said element having outstanding integral portions on the outer of said surfaces adjacent the longitudinally extending sides of said element, said integral portions providing opposed female dovetail walls adapted to receive male dovetail surfaces on said base member, said female dovetail walls being convergently related to said longitudinal centerline in proceeding toward one end of said element, at least one of said female dovetail walls adjacent an end of said element having a further dovetail wall divergently related to said longitudinal centerline in proceeding toward said one end of said element.

2. The structure of claim 1 in which both of said female dovetail walls are equipped with a divergently related dovetail wall adjacent an end of said element.

3. A locked dovetail connection for elements at least one of which is subject to abrasive wear comprising:
a first relatively elongated element having male dovetail surfaces convergently related to the longitudinal centerline of said first element when proceeding toward one end of said first element,
a second relatively elongated element having female dovetail surfaces also convergently related to the longitudinal centerline of said second element when proceeding toward one end of said second element,
said first element male dovetail surfaces being received in the female dovetail surfaces of said second element with the dovetail surfaces of the two elements in contact and with said one ends aligned, each of said elements having a portion extending beyond the dovetail surfaces thereof in one longitudinal direction, said second element portion being equipped with a pair of spaced apart confronting faces, said first element portion being positioned between the second element confronting faces with said first element portion being equipped with a pair of opposed faces transversely aligned with said pair of confronting faces, one of each of said first element opposed faces being associated with and spaced from one of each of said second element confronting faces, and a lock positioned between each second element confronting face and its associated first element opposed face.

4. The connection of claim 3 in which said portions are located between said dovetail surfaces and said one end.

5. The connection of claim 4 in which each element face is divergently related to the longitudinal centerline of said element when proceeding toward said element one end.

6. The connection of claim 5 in which each element is equipped with first and second longitudinally spaced pairs of dovetail surfaces with each dovetail surface having the same inclination to the longitudinal centerline of its associated element.

7. The connection of claim 6 in which said second element is equipped with third and fourth longitudinally spaced pairs of dovetail surfaces with the third and fourth pairs being interlaced between said first and second pairs, the surfaces of said third and fourth pairs being inclined to said longitudinal centerline at an angle which is the reverse of the angle at which the surfaces of said first and second pairs are inclined to said longitudinal centerline.

8. The connection of claim 3 in which said portions are located between said dovetail surfaces and the other end of each element.

9. The connection of claim 8 in which each element face is convergently related to the longitudinal centerline of said element when proceeding toward said other end.

10. The connection of claim 9 in which each element is equipped with first and second longitudinally spaced pairs of dovetail surfaces with each dovetail surface having the same inclination to the longitudinal centerline of its associated element.

11. The connection of claim 10 in which said second element is equipped with third and fourth longitudinally spaced pairs of dovetail surfaces with the third and fourth pairs being interlaced between said first and second pairs, the surfaces of said third and fourth pairs being inclined to said longitudinal centerline at an angle which is the reverse of the angle at which the surfaces of said first and second pairs are inclined to said longitudinal centerline.

12. The connection of claim 3 in which each of said second element portion faces is transversely inclined.

13. The connection of-claim 3 in which each second element confronting face and its associated first element opposed face are inclined at different angles to the element centerline.

14. The connection of claim 3 in which said lock is positioned at a predetermined end of said elements and has faces conforming to the opposed and confronting faces which it contacts, said conforming faces being longitudinally convergent in proceeding away from said predetermined end.

15. An assembly of wear elements for installation on the wearable part of a structure engageable with abrasive material comprising:

a relatively elongated base element adapted to be secured to said wearable part and a relatively elongated wear element releasably, reversibly mounted on said base element along the longitudinal centerline thereof, each of said elements having first and second pairs of longitudinally spaced-apart dovetail surfaces with the surfaces in each pair being spaced symmetrically about the longitudinal centerline thereof, one of said element having third and fourth pairs of longitudinally spaced-apart dovetail surfaces with the surfaces in each pair being spaced symmetrically about the centerline thereof, the dovetail surfaces of said third and fourth pairs being interlaced with the dovetail surfaces of said first and second pairs, the dovetail surfaces of the first and second pairs extending at a predetermined angle with said one element centerline and the dovetail surfaces of said third and fourth paris extending at the reverse of said predetermined angle whereby the first and second pairs of surfaces of the other of said elements can mate with either the first and second pairs of surfaces of said one element or, when reversed end-for-end, with the third and fourth pairs of surfaces of said one element, each of said elements having a portion extending beyond the dovetail surfaces thereof in one longitudinal direction, said wear element portion being equipped with a pair of spaced apart confronting faces, said base element portion being positioned between the first element confronting faces with said base element portion being equipped with a pair of opposed faces transversely aligned with said pair of confronting faces, one of each of said base element opposed faces being associated with and spaced from one of each of said wear element confronting faces and a lock positioned between each base element confronting face and its associated wear element opposed face.

* * * * *